US011521056B2

(12) United States Patent
Fyffe

(10) Patent No.: US 11,521,056 B2
(45) Date of Patent: Dec. 6, 2022

(54) SYSTEM AND METHODS FOR INTRINSIC REWARD REINFORCEMENT LEARNING

(71) Applicant: Graham Fyffe, Los Angeles, CA (US)

(72) Inventor: Graham Fyffe, Los Angeles, CA (US)

(*) Notice: Subject to any disclaimer, the term of this patent is extended or adjusted under 35 U.S.C. 154(b) by 1138 days.

(21) Appl. No.: 15/623,199

(22) Filed: Jun. 14, 2017

(65) Prior Publication Data
US 2017/0364829 A1 Dec. 21, 2017

Related U.S. Application Data

(60) Provisional application No. 62/351,313, filed on Jun. 17, 2016.

(51) Int. Cl.
G06N 3/08 (2006.01)
G06N 20/00 (2019.01)
G06N 3/00 (2006.01)
G06F 30/20 (2020.01)
G06F 111/10 (2020.01)

(52) U.S. Cl.
CPC ............ *G06N 3/08* (2013.01); *G06F 30/20* (2020.01); *G06N 3/006* (2013.01); *G06N 20/00* (2019.01); *G06F 2111/10* (2020.01)

(58) Field of Classification Search
None
See application file for complete search history.

(56) References Cited

U.S. PATENT DOCUMENTS

| 2005/0010542 | A1  | 1/2005  | Steels |
| 2009/0012922 | A1  | 1/2009  | Tesauro et al. |
| 2013/0103490 | A1  | 4/2013  | Abe et al. |
| 2015/0100530 | A1* | 4/2015  | Mnih ..................... A63F 13/67 706/25 |
| 2017/0270653 | A1* | 9/2017  | Garnavi ................ G06N 20/20 |
| 2021/0374604 | A1* | 12/2021 | Kwon ................... G06N 20/00 |
| 2022/0215204 | A1* | 7/2022  | Devi ..................... G06K 9/6215 |

OTHER PUBLICATIONS

Krogh et al, "A Simple Weight Decay Can Improve Generalization", Advances in Neural Information Processing Systems (NIPS 1991), all pages (Year: 1991).*

(Continued)

Primary Examiner — Daniel C Puentes
(74) Attorney, Agent, or Firm — Jennifer Hayes; Nixon Peabody LLP

(57) ABSTRACT

A learning agent is disclosed that receives data in sequence from one or more sequential data sources; generates a model modelling sequences of data and actions; and selects an action maximizing the expected future value of a reward function, wherein the reward function depends at least partly on at least one of: a measure of the change in complexity of the model, or a measure of the complexity of the change in the model. The measure of the change in complexity of the model may be based on, for example, the change in description length of the first part of a two-part code describing one or more sequences of received data and actions, the change in description length of a statistical distribution modelling, the description length of the change in the first part of the two-part code, or the description length of the change in the statistical distribution modelling.

32 Claims, 2 Drawing Sheets

(56) References Cited

OTHER PUBLICATIONS

Zhang et al, "Clique-based Cooperative Multiagent Reinforcement Learning Using Factor Graphs", IEEE/CAA Journal of Automatica Sinica, vol. 1, No. 3 (Year: 2014).*
Zhu et al, "Reinforcement Learning Trees", 2015, J AM Stat Assoc., all pages (Year: 2015).*
Maji et al, "Deep Neural Network and Random Forest Hybrid Architecture for Learning to Detect Retinal Vessels in Fundus Images", 2015, IEEE, all pages (Year: 2015).*
McGovern et al, "Automatic Discovery of Subgoals in Reinforcement Learning using Diverse Density", 2001, Computer Science Department Faculty Publication Series. Retrieved from https://scholarworks.umass.edu/cs_faculty_pubs/8 (Year: 2001).*
Abbeel et al., Learning Factor Graphs in Polynomial Time and Sample Complexity, Journal of Machine Learning Research, 2006, vol. 7, pp. 1743-1788.
Azar et al., Speedy Q-Learning, Advances in Neural Information Processing Systems 24, 2011, pp. 1-10.
Chen et al., Efficient Lossless Compression of Trees and Graphs, Data Compression Conference, 1996, pp. 1-9.
Chen et al., Compressing Neural Networks with the Hashing Trick, Proceedings of the 32rd International Conference on Machine Learning, 2015, pp. 1-10.
Gu et al., Continuous Deep Q-Learning with Model-Based Acceleration, Proceedings of the 33rd International Conference on Machine Learning, 2016, pp. 1-10.
Helske et al., Minimum Description Length Based Hidden Markov Model Clustering for Life Sequence Analysis, Workshop on Information Theoretic Methods in Science and Engineering, 2010, pp. 1-6.
Jaynes, E., Prior Probabilities, IEEE Transactions on Systems Science and Cybernetics, 1968, vol. 4(3), pp. 227-241.
Lopes et al., Exploration in Model-Based Reinforcement Learning by Empirically Estimating Learning Progress, Advances in Neural Information Processing Systems 25, 2012, pp. 1-9.
Mnih et al., Asynchronous Methods for Deep Reinforcement Learning, Proceedings of the 33rd International Conference on Machine Learning, 2016, pp. 1-19.
Oudeyer et al., Intrinsic Motivation Systems for Autonomous Mental Development, IEEE Transactions of Evolutionary Computation, 2007, vol. 11(2), pp. 265-286.
Singh et al., Intrinsically Motivated Reinforcement Learning, Advances in Neural Information Processing Systems 17, 2004, pp. 1-8.
Walsh et al., Exploring Compact Reinforcement-Learning Representations with Linear Regression, Proceedings of the Twenty-Fifth Conference on Uncertainty in Artificial Intelligence, 2009, pp. 591-598.
Wick et al., Training Factor Graphs with Reinforcement Learning for Efficient MAP Interference, Advances in Neural Information Processing Systems 22, 2009, pp. 1-9.
Zhou, F., Graph Compression, Department of Computer Science and Helsinki Institute for Information Technology HIIT, 2015, pp. 1-12.
International Search Report and Written Opinion for PCT/US2017/037546 dated Aug. 16, 2017, 15 pages.

* cited by examiner

SYSTEM AND METHODS FOR INTRINSIC REWARD REINFORCEMENT LEARNING

CROSS-REFERENCE TO RELATED APPLICATIONS

The present application claims priority to U.S. Provisional Patent Application No. 62/351,313, entitled "System and Method for Intrinsic Reward Reinforcement Learning," filed Jun. 17, 2016, the entirety of which is hereby incorporated by reference.

BACKGROUND: FIELD OF THE INVENTION

The invention pertains to a system and methods for reinforcement learning, and, in particular, intrinsically motivated reinforcement learning.

BACKGROUND: RELATED ART

Reinforcement learning is a category of machine learning in which a machine (agent) learns a policy specifying which action to take in any situation (state), in order to maximize the expected reward according to a reward function. Reinforcement learning methods typically compute a value function expressing the expected longer term reward of a state, and may also compute a predictive model of the environment in terms of sequences of states, actions, and rewards. While powerful, reinforcement learning agents are dependent on the crafting of an appropriate reward function towards some task or goal, for example scoring points in a game, and are further dependent on hand-tuned parameters controlling learning rates, future reward discount factors, and exploit-vs-explore trade-offs. Natural learning agents, such as humans, apparently do not suffer from such limitations.

Q Learning is a reinforcement learning method that does not explicitly construct a predictive model of the environment. Instead, it directly computes a value function called a Q function, which in its simplest form is represented as a table that maps state-action pairs to expected value. Table representations do not scale to large domains, so function approximations are often employed including convolutional neural networks. Q learning suffers from slow convergence compared to model-based methods, which is typically mitigated using so-called experience replay, which samples sequences of states that were previously encountered and stored in a replay memory. The replay memory itself effectively serves as a predictive model of the environment, based on discrete sampling. While Q Learning has received much attention in recent works, none address the issue of designing general reward functions.

The concept of intrinsic motivation has been introduced into reinforcement learning in an effort to enable an agent to learn aspects of the environment not directly related to a specific goal, through self-guided exploration. Typical intrinsic motivation techniques reward exploration of states that are not well predicted by the model, or reward increased reliability in predictions which is sometimes referred to as progress. While these methods show some promise, an agent that is driven to explore and model every last minutia of its environment is not likely to perform effectively in highly complex domains.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

A solution for reinforcement learning using an intrinsic reward function that requires no task-specific programming, and instead rewards the act of learning itself. In essence, learning is its own reward. Such a function may be employed to drive a general agent, or may be used in combination with a task-specific reward function as an alternative to ad-hoc exploit-vs-explore heuristics. The main feature of the invention that sets it apart from previous intrinsically motivated learning agents is a reward function based on the change in the complexity of the learned model, or the complexity of the change of the learned model, or both, optionally in combination with a task-specific reward, and optionally in combination with traditional intrinsic motivation rewards such as rewarding the accuracy of the model. Intuitively, encouraging large changes in the complexity of the learned model will encourage the agent to maximize its knowledge. We propose several measures of complexity that measure structure in the model while ignoring noise in the observed data, so that the agent is rewarded for discovering more complex structures, and not rewarded for simply finding more data. Further, encouraging more complex changes in the learned model will encourage the agent to challenge its own understanding of the data, which may help prevent the agent from becoming obsessed with a subset of data containing a great deal of structure.

A learning agent may receive data in sequence from one or more sequential data sources; generate a model modelling sequences of data and actions; and select an action maximizing the expected future value of a reward function, wherein the reward function depends at least partly on at least one of: a measure of the change in complexity of the model, or a measure of the complexity of the change in the model. The agent may be trained using any reasonable reinforcement learning technique, for example Q Learning with experience replay, or deep reinforcement learning.

Any reasonable measure of the change in complexity of the model may be employed, but those that measure structure while ignoring noise are advantageous. For example, the measure of the change in complexity of the model may be based on the change in description length or, equivalently, the change in negative log likelihood, of the first part of a two-part code describing one or more sequences of received data and actions, Alternatively, the measure of the change in complexity of the model may be based on the change in description length or, equivalently, the change in negative log likelihood, of a statistical distribution modelling one or more sequences of received data and actions.

Likewise, any reasonable measure of the complexity of the change in the model may be employed, but those that measure structure while ignoring noise are advantageous. For example, the measure of the complexity of the change in the model may be based on the description length or, equivalently, the negative log likelihood, of the change in the first part of a two-part code describing one or more sequences of received data and actions. Alternatively, the measure of the complexity of the change in the model may be based on the description length or, equivalently, the negative log likelihood, of the change in a statistical distribution modelling one or more sequences of received data and actions.

The representation of the model may take any form that is useful for predicting or synthesizing sequences of data and actions, which may be used to generate training samples for the reinforcement learning algorithm. Examples include: a neural network that approximately predicts sequences of received data and actions; a replay memory that stores sequences of received data and actions; or a statistical distribution factorized into potential functions over cliques on a factor graph containing nodes corresponding to the data sources as well as zero or more additional nodes corresponding to auxiliary variables.

The description length of a factor graph model may be computed as the sum of description length of the graph structure and the description lengths of the potential functions defined over cliques on the graph. The description length of commonly occurring potential functions may be discounted, and the description length of commonly occurring subgraphs in the factor graph may be discounted. Indeed any reasonable compressed graph representation may be adapted to include clique potentials and employed in computing the description length.

A potential function associated with a clique defined in a factor graph may be conditioned on a conditioning value at each node in the clique. The conditioning value at a node may come from the data source associated with the node (if any); a random value; or a maximum likelihood value estimated from the factor graph with potential functions conditioned on another, possibly different, set of conditioning values, for example from a previous point in time. This allows the potential functions to be conditioned on the data, and also enables the factor graph to represent temporal structure.

Maximum likelihood values and marginal distributions at the factor graph nodes may be employed to generate data for training the reinforcement learning, and may be estimated using any reasonable factor graph inference algorithm. The potential functions may be learned using any reasonable factor graph learning algorithm.

In accordance with one aspect of the invention, a system, method and computer readable medium are disclosed for reinforcement learning that perform actions from a set of available actions; receive data in sequence from one or more sequential data sources; generate a model that models sequences of the received data and the performed actions; and select an action to maximize an expected future value of a reward function, wherein the reward function depends at least partly on at least one of: a measure of a change in complexity of the model or a measure of the complexity of the change in the model.

The measure of the change in complexity of the model may be based on a change in description length of the first part of a two-part code describing one or more sequences of received data and actions.

The measure of the change in complexity of the model may be based on a change in negative log likelihood of the first part of a two-part code describing one or more sequences of received data and actions.

The measure of the complexity of the change in the model may be based on a description length of a change in a first part of a two-part code describing one or more sequences of received data and actions.

The measure of the complexity of the change in the model may be based on a negative log likelihood of a change in a first part of a two-part code describing one or more sequences of received data and actions.

The measure of the change in complexity of the model may be based on a change in description length of a statistical distribution modelling one or more sequences of received data and actions.

The measure of the change in complexity of the model may be based on a change in negative log likelihood of a statistical distribution modelling one or more sequences of received data and actions.

The measure of the complexity of the change in the model may be based on a description length of a change in a statistical distribution modelling one or more sequences of received data and actions.

The measure of the complexity of the change in the model may be based on a negative log likelihood of a change in a statistical distribution modelling one or more sequences of received data and actions.

The model may be represented as a neural network that approximately predicts sequences of received data and actions.

The model may be represented as a replay memory that stores sequences of received data and actions, and an action is at least sometimes selected according to an action-value function learned via Q Learning with experience replay.

The model may be represented as a statistical distribution factorized into potential functions over cliques on a factor graph containing nodes corresponding to the data sources as well as zero or more additional nodes corresponding to auxiliary variables.

A first potential function may be similar to a second potential function when variables in the first potential function are substituted for variables in the second potential function, and the complexity of the model may be reduced by the second potential function referencing the first potential function or by the first and second potential functions referencing a common function.

A potential function over a clique may be conditioned on a conditioning value at each node in the clique, where the conditioning value at each node may be one of: a data value received from a data source associated with the node; a random value; or a maximum likelihood value estimated from the factor graph with potential functions conditioned on another set of conditioning values.

The another set of conditioning values are different from a previous point in time.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Embodiments of the invention are directed to a learning agent that receives data in sequence from one or more sequential data sources; generates a model modelling sequences of data and actions; and selects an action maximizing the expected future value of a reward function, wherein the reward function depends at least partly on at least one of: a measure of the change in complexity of the model, or a measure of the complexity of the change in the model. The measure of the change in complexity of the model may be based on the change in description length of the first part of a two-part code describing one or more sequences of received data and actions, or the change in description length of a statistical distribution modelling one or more sequences of received data and actions. The measure of the complexity of the change in the model may be based on the description length of the change in the first part of a two-part code describing one or more sequences of received data and actions, or the description length of the change in a statistical distribution modelling one or more sequences of received data and actions. The representation of the model may be a neural network that approximately predicts sequences of received data and actions, a replay memory that stores sequences of received data and actions, or a statistical distribution factorized into potential functions over cliques on a factor graph containing nodes corresponding to the data sources as well as zero or more additional nodes corresponding to auxiliary variables. The description length may be discounted for commonly occurring potential functions, and for subgraphs that are isomorphic to other. A potential function associated with a clique may be conditioned on a set of conditioning values, which may come from the data sources, random valued; or maximum likelihood valued estimated from the factor graph with potential functions conditioned on another, possibly different, set of conditioning values.

Examples of applications of the reinforcement learning agent systems and methods disclosed herein include computer opponent for games and entertainment, elevator control, job scheduling, cellular device channel allocation, robot control, supply chain management and the like. In addition, the reinforcement learning agent systems and methods disclosed herein may be combined with the systems and methods for suggesting beneficial actions disclosed in U.S. application Ser. No. 15/477,959, filed Apr. 3, 2017, the entirety of which is hereby incorporated by reference. It will be appreciated that there are numerous other applications of the reinforcement learning systems and methods described herein as understood by those of skill in the art.

Figure 1:
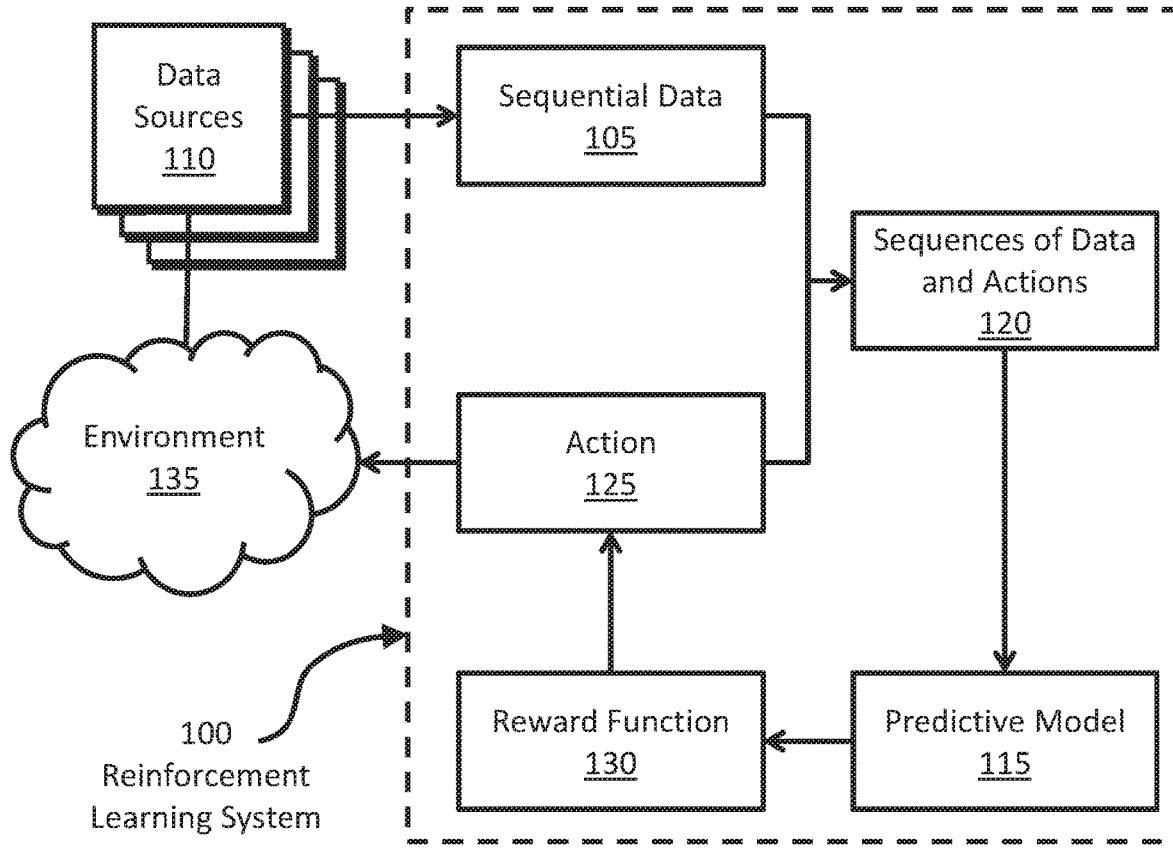
FIG. 1 is a diagram of a system in accordance with one embodiment of the invention.

FIG. 1 shows a reinforcement learning system 100 in accordance with one embodiment of the invention. The reinforcement learning system 100 includes sequential data 105, a predictive model 115, a set of actions 125, sequences of data and actions 120, and a reward function 130.

The system 100 receives the sequential data 105 from one or more sequential data sources 110. The data 105 may relate to an environment 135. Examples of data sources 110 include: pixel values from an image sensor, audio sample values from a microphone, characters in a text stream, telemetry values from a motor system with feedback, image or text media output from a computer application, media data obtained from the internet, or the like.

The system 100 generates the predictive model 115, which models the sequences 120, as discussed in further detail below.

The system 100 selects an action 125 maximizing the expected future value of a reward function 130. Examples of actions 125 the system may select include outputting signals to drive a motor, outputting audio samples to a speaker, outputting pixel values to a display, outputting text characters to drive a speech synthesis device, inputting commands to a computer application, retrieving a media file from the internet, or the like. The reward function 130 depends at least partly on at least one of: a measure of the change in complexity of the model 115, or a measure of the complexity of the change in the model 115. The system 100 may perform the selected action 125 and the action 125 may have an effect on the environment 135.

The system 100 may be trained using any reasonable reinforcement learning technique. In general, the model 115 of sequences 120 of received data and actions may be constructed based on the data 105 received by the system and the actions 125 selected by the system, independent of the choice of reinforcement learning technique. It will be appreciated that some reinforcement techniques already include a model; in such cases, the model included in the reinforcement technique may be employed as the model 115 for the purposes of computing the reward function 130. To compute the reward function 130, any reasonable measure of the change in complexity of the model 115 may be employed, and any reasonable measure of the complexity of the change in the model 115 may be employed, but those that measure structure while ignoring noise are advantageous. The representation of the model 115 may take any form that is useful for predicting or synthesizing sequences 120 of data and actions, which may be employed to train the reinforcement learning algorithm.

Figure 2:
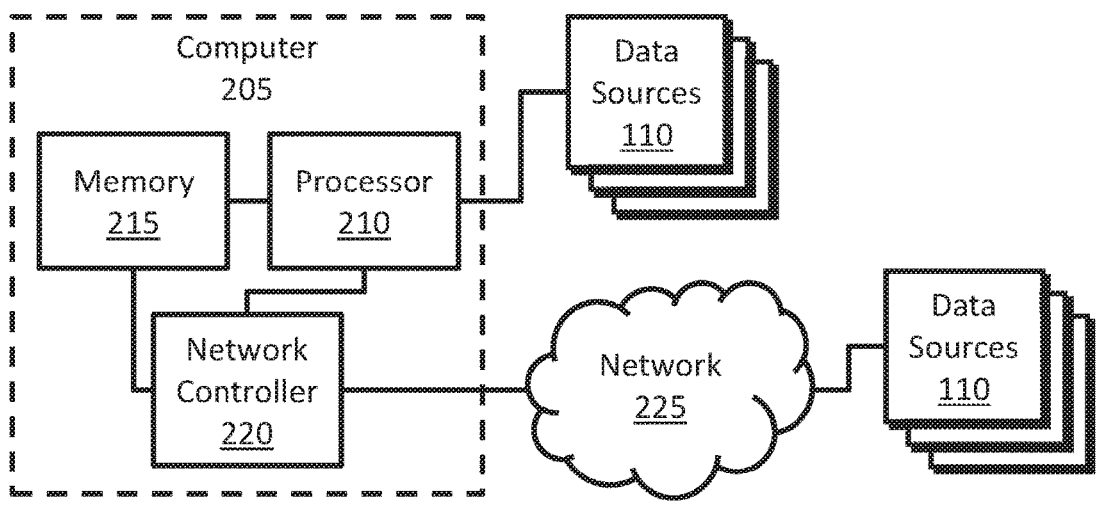
FIG. 2 illustrates a computer connected to one or more data sources in accordance with one embodiment of the invention.

FIG. 2 depicts a computer 205 connected to one or more data sources 110 and a network 225. In one embodiment, the reinforcement learning system 100 includes the computer 205 connected to the network 225. The computer 205 is configured with one or more processors 210, a memory 215, and one or more network controllers 220. It is understood that the components of the computer 205 are configured and connected in such a way as to be operational, so that an operating system and application programs may reside in the memory 215 and may be executed by the processor or processors 210 and data may be transmitted or received via the network controller 220 according to instructions executed by the processor or processors 210. In one embodiment, a data source 110 may be connected to the system 100 remotely via the network 225, for example in the case of media data obtained from the Internet. In one embodiment, a data source 110 may be connected directly to the computer 205 and accessible to the processor 210, for example in the case of an imaging sensor, telemetry sensor, or the like. Those skilled in the art will appreciate that the one or more processors 210, memory 215, or network controllers 220 may physically reside on multiple physical components within the computer 205, or may be integrated into fewer physical components within the computer 205, without departing from the scope of the invention. In one embodiment, a plurality of computers 205 may be configured to execute some or all of the steps listed herein, such that the cumulative steps executed by the plurality of computers are in accordance with the invention.

Figure 3:
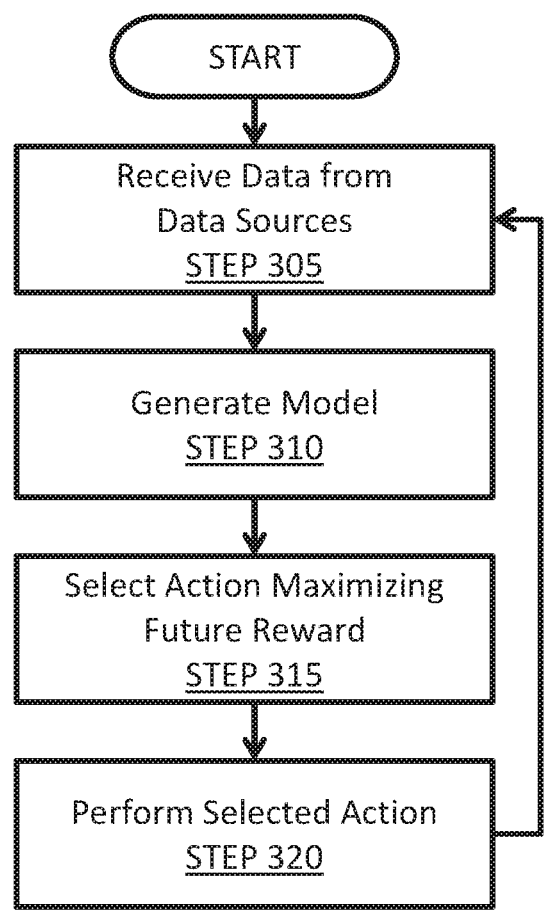
FIG. 3 is a flowchart illustrating a method in accordance with one embodiment of the invention.

FIG. 3 shows a flowchart in accordance with one or more embodiments of the invention. It is understood by those skilled in the art that some steps are optional, and some steps may be performed in a different sequence, without departing from the scope of the invention. In STEP 305, sequential data 105 is received from one or more sequential data sources 110 where the data 105 may relate to an environment 135. In STEP 310, a predictive model 115 is generated that models sequences 120 of data and actions. In STEP 315, an action 125 is selected to maximize the expected future value of a reward function 130, wherein the reward function 130 depends at least partly on at least one of: a measure of the change in complexity of the model 115, or a measure of the complexity of the change in the model 115. In STEP 320, the selected action 125 may be performed, and may have an effect on the environment 135.

In one embodiment, a computer 205 is configured to execute instructions to: receive sequential data 105 from one or more sequential data sources 110 where the data 105 may relate to an environment 135; generate a predictive model 115 that models sequences 120 of data and actions; select an action 125 to maximize the expected future value of a reward function 130, wherein the reward function 130 depends at least partly on at least one of: a measure of the change in complexity of the model 115, or a measure of the complexity of the change in the model 115; and perform the selected action 125, which may have an effect on the environment 135. Data 105 may be transmitted from a data source 110 to a computer 205 via a computer network 225. Data 105 may also be accessed by the computer 205 from a data source 110 connected to the computer 205. It is understood by those skilled in the art that some steps are optional, and some steps may be performed in a different sequence, without departing from the scope of the invention. A computer readable medium may store instructions for performing the steps listed herein.

In one embodiment, the measure of the change in complexity of the model 115 may be based on the change in description length or, equivalently, the change in negative log likelihood, of the first part of a two-part code describing one or more sequences 120 of received data and actions, and the measure of the complexity of the change in the model 115 may be based on the description length or, equivalently, the negative log likelihood, of the change in the first part of a two-part code describing one or more sequences 120 of received data and actions.

In one embodiment, the measure of the change in complexity of the model 115 may be based on the change in description length or, equivalently, the change in negative log likelihood, of a statistical distribution modelling one or more sequences 120 of received data and actions, and the measure of the complexity of the change in the model 115 may be based on the description length or, equivalently, the negative log likelihood, of the change in a statistical distribution modelling one or more sequences 120 of received data and actions. In one embodiment, statistical distributions belonging to the exponential family may be assigned a description length based on the negative logarithm of the Jeffries prior.

In one embodiment, Q Learning with experience replay is used to train the system 100.

In one embodiment, deep reinforcement learning is used to train the system 100.

In one embodiment, the model 115 may be represented as a neural network that approximately predicts sequences 120 of received data and actions. In one embodiment, a model 115 represented as a neural network may be assigned a description length based on the storage requirements of a compressed representation of the neural network, for example, using Hashed Nets.

In one embodiment, the model 115 may be represented as a replay memory that stores sequences 120 of received data and actions. In one embodiment, a model represented as a replay memory may be assigned a description length based on the description length of the model parameters of a model selected using unsupervised learning based on the minimum description length principle for sequences, for example.

In one embodiment, the model 115 may be represented as a statistical distribution factorized into potential functions over cliques on a factor graph containing nodes corresponding to the data sources as well as zero or more additional nodes corresponding to auxiliary variables. Potential functions may be represented as Gaussian mixture models, stochastic samples, discrete density functions, or other reasonable density functions.

In one embodiment, the description length of a factor graph model may be computed as the sum of description length of the graph structure and the description lengths of the potential functions defined over cliques on the graph. In one embodiment, a Gaussian mixture model may be assigned a description length of $½M (L+1) \log N$, where M is the number of mixture components, L is the number of parameters defining each component, and N is the number of samples employed to construct the Gaussian mixture model, and the mixture components may be generated using the minimum description length principle. In one embodiment, density functions belonging to the exponential family may be assigned a description length based on the negative logarithm of the Jeffries prior. In one embodiment, the description length of commonly occurring potential functions may be discounted. For example, two or more potential functions present in the factor graph that differ only by variable substitution may reference a common function definition and store only the required substitutions, thereby amortizing the description length over the multiple potential functions. A similar concept may be applied for sharing only part of a potential function while other parts differ, for example sharing a subset of the components occurring in a Gaussian mixture model representation. The description length of a commonly occurring subgraph in the factor graph may be discounted, where the subgraph is isomorphic to one or more other subgraphs having cliques with similar potential functions up to variable substitutions, which may be implemented by referencing a common definition and the required variable substitutions and graph edges connecting the subgraph to the rest of the factor graph. Indeed, any reasonable compressed graph representation may be adapted to include clique potentials and employed in computing the description length. In one embodiment, a potential function associated with a clique may be conditioned on a conditioning value at each node in the clique. The conditioning value at a node may come from the data source associated with the node (if any); a random value; or a maximum likelihood value estimated from the factor graph with potential functions conditioned on another, possibly different, set of conditioning values, for example from a previous point in time. This allows the potential functions to be conditioned on the data, and also enables the factor graph to represent temporal structure. In one embodiment, maximum likelihood values and marginal distributions at the factor graph nodes may be employed to generate data for training the reinforcement learning, and may be estimated using any reasonable factor graph inference algorithm. The potential functions may be learned using any reasonable factor graph learning algorithm.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

It should be understood that components described herein include computer hardware and/or executable software code which is stored on a computer-readable medium for execution on appropriate computing hardware.

The terms "computer-readable medium" or "machine readable medium" should be taken to include a single medium or multiple media that store the one or more sets of instructions. The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. The terms "computer-readable medium" or "machine readable medium" shall accordingly be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A reinforcement learning system, comprising:
one or more processors; and
one or more programs residing on a memory and executable by the one or more processors, the one or more programs configured to:
perform actions from a set of available actions that affect an environment;
receive data in sequence from one or more sequential data sources that relate to the environment;
generate a model that models sequences of the received data and the performed actions, wherein the model is a parametric model defined according to a set of parameters; and
select an action to maximize a value function for reinforcement learning by estimating the expected future measure of a change in complexity of the model following the action,
wherein the measure of the change in complexity measures complexity of the set of parameters to reward a learning agent for discovering more complexity.

2. The system of claim 1, wherein the measure of the change in complexity of the model is based on a change in description length of the first part of a two-part code describing one or more sequences of received data and actions.

3. The system of claim 1, wherein the measure of the change in complexity of the model is based on a change in negative log likelihood of the first part of a two-part code describing one or more sequences of received data and actions.

4. The system of claim 1, wherein the measure of the change in complexity of the model is based on a change in description length of a statistical distribution modelling one or more sequences of received data and actions.

5. The system of claim 1, wherein the measure of the change in complexity of the model is based on a change in negative log likelihood of a statistical distribution modelling one or more sequences of received data and actions.

6. The system of claim 1, wherein the model is represented as a neural network that approximately predicts sequences of received data and actions.

7. The system of claim 1, wherein the model is represented as a replay memory that stores sequences of received data and actions, and an action is at least sometimes selected according to an action-value function learned via Q Learning with experience replay.

8. The system of claim 1, wherein the model is represented as a statistical distribution factorized into potential functions over cliques on a factor graph containing nodes corresponding to the one or more sequential data sources as well as zero or more additional nodes corresponding to auxiliary variables.

9. The system of claim 8, wherein the potential functions comprise at least a first potential function and a second potential function, and wherein the first potential function is similar to the second potential function when variables in the first potential function are substituted for variables in the second potential function, and the complexity of the model is reduced by the second potential function referencing the first potential function or by the first and second potential functions referencing a common function.

10. The system of claim 8, wherein one or more of the potential functions over cliques are conditioned on one or more conditioning values at each node in the clique, where the one or more conditioning values at each node is one of: a data value received from a data source associated with the node; a random value; or a maximum likelihood value estimated from the factor graph with potential functions conditioned on another set of conditioning values.

11. The system of claim 10, wherein the potential functions are further conditioned on one or more conditioning values from a time that is prior to a time the model is generated.

12. The system of claim 1, wherein the data sources comprise one or more of pixel values from an image sensor, audio sample values from a microphone, characters in a text stream, telemetry values from a motor system with feedback, image or text media output from a computer application, media data obtained from the internet.

13. The system of claim 1, wherein the selected action comprises one or more of outputting signals to drive a motor, outputting audio samples to a speaker, outputting pixel values to a display, outputting text characters to drive a speech synthesis device, inputting commands to a computer application, and retrieving a media file from the internet.

14. The system of claim 1, wherein the one or more programs are further configured to perform the selected action, the selected action having an effect on an environment.

15. The system of claim 1, wherein the one or more programs are further configured to update the model periodically or whenever new data is received.

16. The system of claim 1, wherein the one or more programs are further configured to receive a reward for a change in complexity of the model based on a measure of the complexity of the model before an update compared to a measure of the complexity of the model after an update.

17. A method for reinforcement learning, comprising the steps of:
performing actions from a set of available actions that affect an environment;
receiving data in sequence from the one or more sequential data sources that relate to the environment;
generating a model, wherein the model is configured to model sequences of the received data and actions, wherein the model is a parametric model defined according to a set of parameters; and
selecting an action to maximize a value function for reinforcement learning estimating the expected future measure of a change in complexity of the model following the action,
wherein the measure of the change in complexity measures the complexity of the set of parameters defining the model to reward a learning agent for discovering more complexity.

18. The method of claim 17, wherein the measure of the change in complexity of the model is based on a change in description length of the first part of a two-part code describing one or more sequences of received data and actions.

19. The method of claim 17, wherein the measure of the change in complexity of the model is based on a change in negative log likelihood of the first part of a two-part code describing one or more sequences of received data and actions.

20. The method of claim 17, wherein the measure of the change in complexity of the model is based on a change in description length of a statistical distribution modelling one or more sequences of received data and actions.

21. The method of claim 17, wherein the measure of the change in complexity of the model is based on a change in negative log likelihood of a statistical distribution modelling one or more sequences of received data and actions.

22. The method of claim 17, wherein the model is represented as a neural network that approximately predicts sequences of received data and actions.

23. The method of claim 17, wherein the model is represented as a replay memory that stores sequences of received data and actions, and an action is at least sometimes selected according to an action-value function learned via Q Learning with experience replay.

24. The method of claim 17, wherein the model is represented as a statistical distribution factorized into potential functions over cliques on a factor graph containing nodes corresponding to the one or more sequential data sources as well as zero or more additional nodes corresponding to auxiliary variables.

25. The method of claim 24, wherein the potential functions comprise at least a first potential function and a second potential function, and wherein the first potential function is similar to the second potential function when variables in the first potential function are substituted for variables in the second potential function, and the complexity of the model is reduced by the second potential function referencing the first potential function or by the first and second potential functions referencing a common function.

26. The method of claim 24, wherein one or more of the potential functions over cliques are conditioned on one or more conditionings value at each node in the clique, where the one or more conditioning values at each node is one of: a data value received from a data source associated with the node; a random value; or a maximum likelihood value estimated from the factor graph with potential functions conditioned on another set of conditioning values.

27. The method of claim 26, wherein one or more of the potential functions are further conditioned on one or more conditioning values from a time that is prior to a time the model is generated.

28. The method of claim 17, wherein the data sources comprise one or more of pixel values from an image sensor, audio sample values from a microphone, characters in a text stream, telemetry values from a motor system with feedback, image or text media output from a computer application, media data obtained from the internet.

29. The method of claim 17, wherein the selected action comprises one or more of outputting signals to drive a motor, outputting audio samples to a speaker, outputting pixel values to a display, outputting text characters to drive a speech synthesis device, inputting commands to a computer application, and retrieving a media file from the internet.

30. The method of claim 17, further comprising performing the selected action, the selected action having an effect on an environment.

31. The method of claim 17, further comprising updating the model periodically or whenever new data is received.

32. The method of claim 17, further comprising receiving a reward for a change in complexity of the model based on a measure of the complexity of the model before an update compared to a measure of the complexity of the model after an update.

* * * * *